INVENTORS
Waldemar T. Rentschler
and Franz W. R. Starp

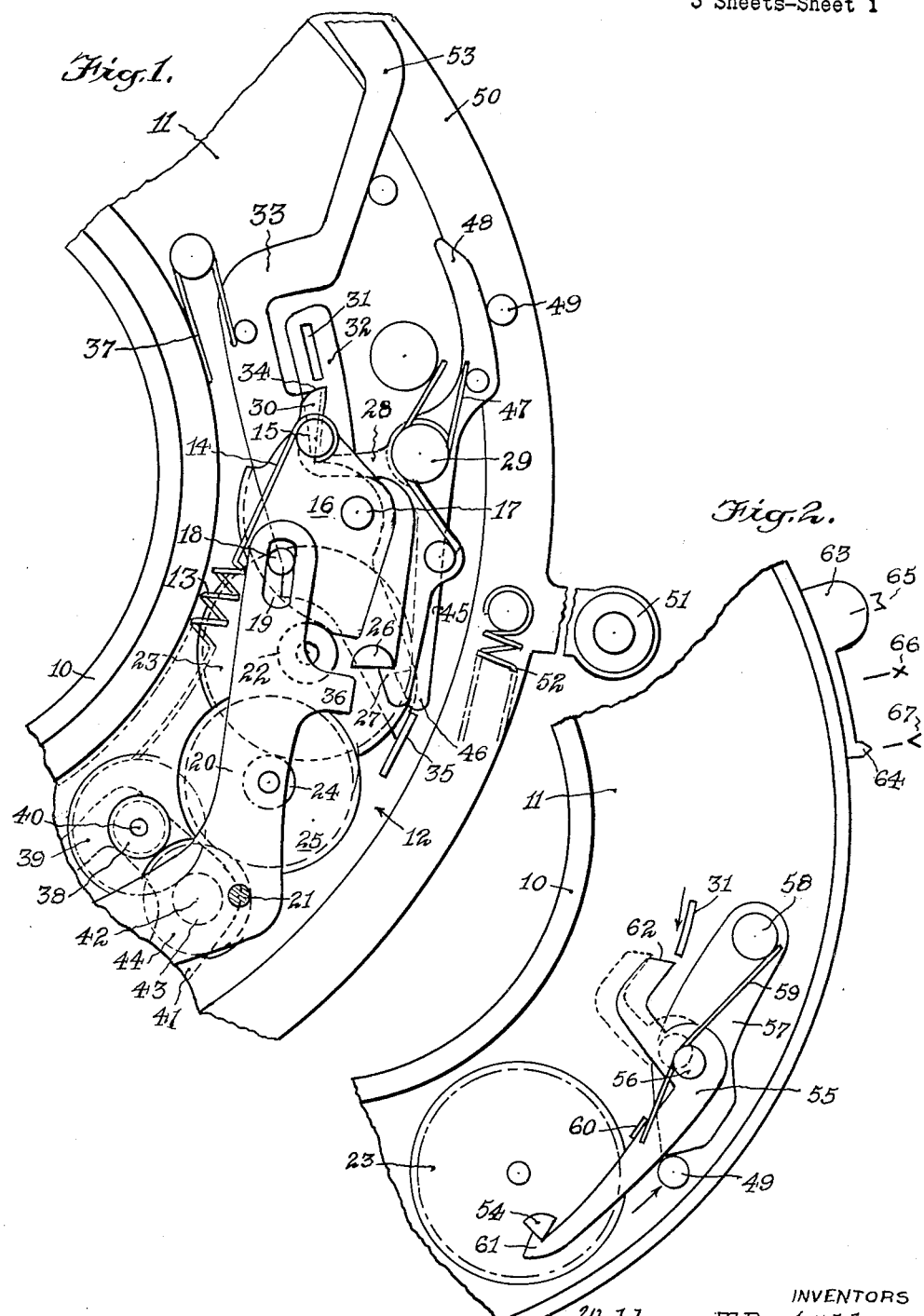

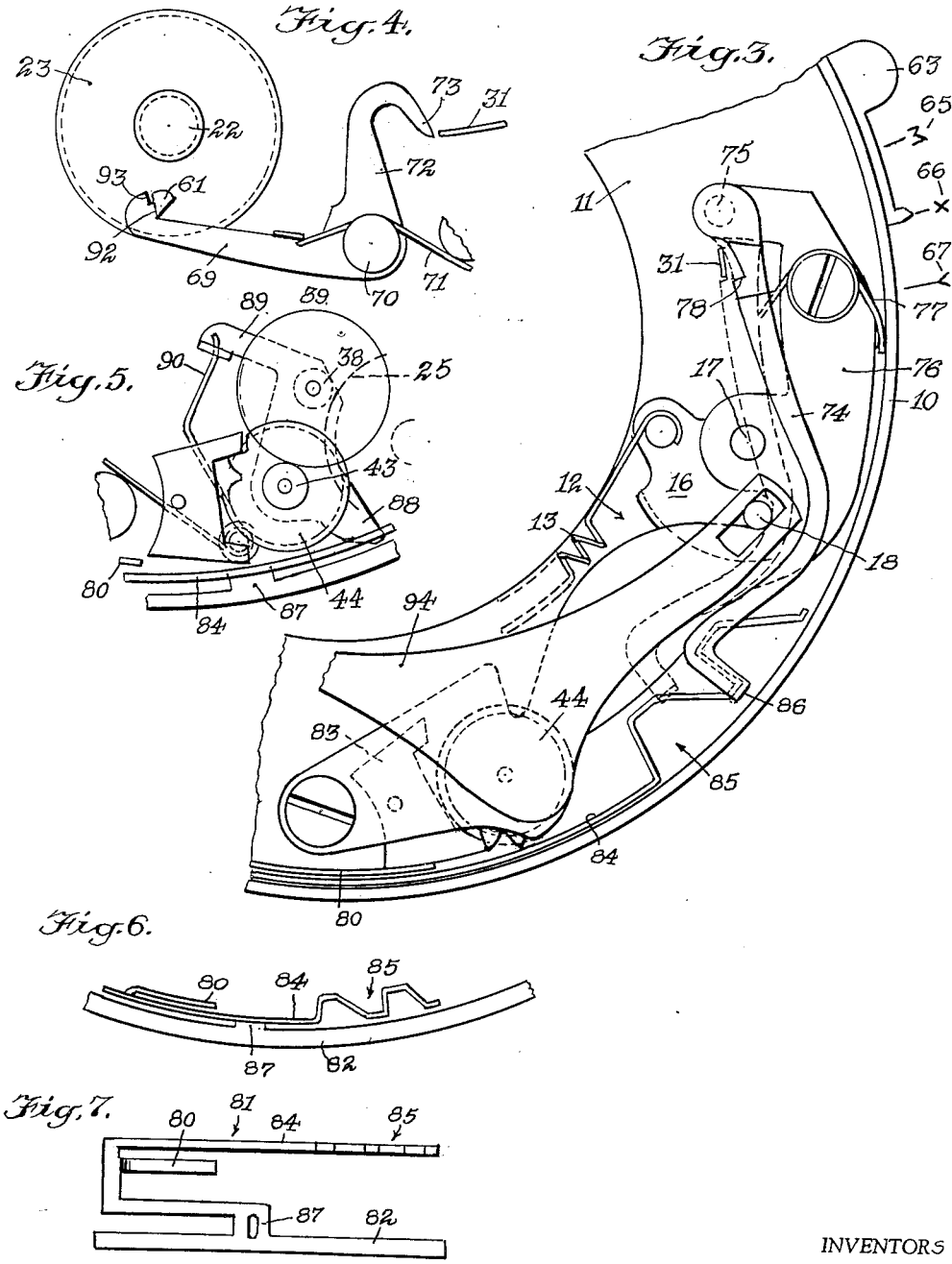

BY Munn, Liddy, Nathanson & March
ATTORNEYS

United States Patent Office 2,984,168
Patented May 16, 1961

2,984,168

PHOTOGRAPHIC SHUTTER WITH DELAYED-ACTION DEVICE

Waldemar T. Rentschler and Franz W. R. Starp, Calmbach (Enz), Germany, assignors to Alfred Gauthier G.m.b.H., Calmbach (Enz), Germany, a corporation of Germany Filed May 10, 1955, Ser. No. 507,352

Claims priority, application Germany May 13, 1954

10 Claims. (Cl. 95—53.6)

This invention relates to photographic shutters, and more particularly to an intra-lens shutter provided with a delayed-action device which is actuated by the shutter drive mechanism.

Photographic intra-lens shutters of this kind have a number of advantageous features, which have found favor with camera users. For example, such shutters are easy to mount and adjust, and the same is true of the delayed-action devices which are incorporated in the shutters. However, with prior intra-lens shutters the delayed-action device after its cocking has always been actuated whenever the shutter drive mechanism was operated.

Heretofore, in the course of efforts to automatize the various operations, shutters have been produced by which the delayed-action device was cocked simultaneously with the cocking of the shutter drive mechanism, and this was desired particularly when the delayed action device consisted of two separate groups or portions which could be either coupled to each other or uncoupled, one such portion serving as a synchro device for the synchronization of flash lamps of the type having a time lag. With such shutters the actuating of the shutter release lever puts into motion the shutter drive mechanism, which in turn releases the delayed-action device. The shutter drive mechanism is thereupon stopped by a lock for an interval of time determined by the delayed-action device, whereupon it is again released to complete the cycle.

In shutters of the above type it is desirable at times to actuate the shutter without the time delay, or without operation of the synchro device for the flash lamp. Also, it may be desirable to open the shutter while the shutter drive mechanism is cocked, as by actuating the shutter blade ring, this being required for instance in connection with the viewing device of a reflex camera. In each of the above circumstances, heretofore the delayed-action or synchro device was always needlessly actuated, resulting in increased wear of the various parts. Also, it necessitated recocking the delayed-action device in order to again provide for an unlimited option for the various settings and exposures which might be subsequently desired.

The above disadvantage existing in these prior intra-lens shutters is obviated by the present invention, and an object of the invention is to provide an improved photographic shutter wherein the delayed-action or synchro device may remain cocked during operations of the shutter which do not require its operation. By the present invention this is accomplished while still retaining the highly desirable simplicity of operation attendant the simultaneous cocking of the delayed-action device and the shutter drive mechanism. Thus, there is made possible the actuation of the shutter and/or the opening thereof, for any purposes desired, while retaining in cocked position the delayed-action device.

The above is accomplished, according to the invention, by the provision of a settable control having a locking device which is operable to maintain the delayed-action device in cocked position during certain actuations of the shutter drive mechanism, said settable control rendering inoperative the detent lock heretofore normally provided, which detained the shutter drive mechanism for a period of time determined by the delayed-action device.

The invention provides, in conjunction with the said settable control, a second lock for the delayed-action device, which second lock is not subject to release by the shutter drive mechanism. In one embodiment of the invention the second lock and the first lock are very similar to each other and engage one and the same member of the delayed-action device, and this provides a simple and economical structure, especially when the locks are in the form of latches operable on a single stop member of the delayed-action device. Such structure requires but little additional space axially of the lens and shutter. Where, however, such additional space is not available there is provided, as set forth in another embodiment of the invention, a second lock which is different from the first and located remote therefrom, said second lock being extremely simple and comprising a device adapted to press the balance of the delayed-action device against the balance wheel.

In still another embodiment of the invention the same result is accomplished without the provision of the second lock, by arranging the first lock, which is responsive to the shutter drive mechanism, so that it may retain its locking function while at the same time being optionally shiftable out of the influence of the said shutter drive. Thus, the shiftable single lock may take over the functions of the two locks above described, and such a single lock may also constitute a simple latch engageable with a stop member on the delayed-action device.

The settable control provided by the invention may be in the form of a ring, for the sake of simplicity and to meet mounting requirements, said ring being concentric about the shutter aperture. The settable ring may also serve to couple and uncouple the two portions of the delayed-action device and also render operative or inoperative the contacts provided for the flash lamp.

The settable control ring may have three positions, designated herein as M, X and V, and the arrangement may be such that the detent device or lock for the shutter drive mechanism is allowed to be inoperative only for the X position of the control ring. Such position, therefore, would not produce a delayed-action of the shutter nor be associated with a flash exposure with lamps having a time lag. The remaining two positions would utilize either one or both portions of the delayed-action device, and therefore the function of the detent or lock means for the shutter drive would be retained. In providing the control ring, the number of parts required is small since arms may be provided on the ring for coupling and uncoupling the two portions of the delayed-action device and for rendering operative or inoperative the contacts for the flash lamps. Also the arms may be utilized to maintain cocked the delayed-action device and to render inoperative the detent device which is normally operative on the shutter drive mechanism.

Other features and advantages of the invention will hereinafter appear.

In the accompanying drawings, illustrating several embodiments of the invention:

Fig. 1 is a fragmentary front elevational view of a portion of a shutter mechanism and delayed-action device made in accordance with the invention, the said delayed-action device being shown in cocked position. The means for maintaining the delayed-action device cocked is shown in inoperative position.

Fig. 2 is a fragmentary view of a portion of the mechanism shown in Fig. 1, illustrating a modification of the invention.

Fig. 3 is a view like Fig. 1 but illustrating another modification of the invention.

Figs. 4, 5, 6 and 7 show various subassemblies or individual parts of the device of Fig. 3.

Figure 9:
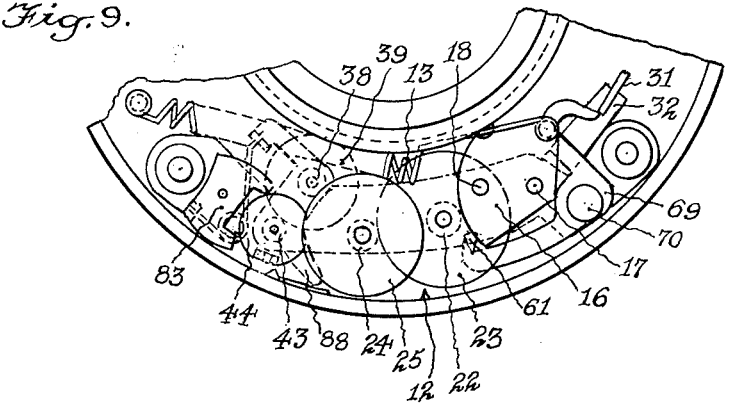
Fig. 9 is a fragmentary front view of a portion of the structure shown in Fig. 8, with some of the omitted parts included and with other parts omitted.

In Fig. 9 most of the delayed-action device is illustrated.

Referring to Fig. 1 there is shown a shutter housing 10 having a base plate 11 on which mounted a delayed-action device indicated generally by the numeral 12. For the sake of clarity of illustration only certain portions of the delayed-action device 12 are shown in this figure, and the bearing plates have also been omitted for the same reason.

The delayed-action device 12 is powered by a helical expansion spring 13 having one end (not shown in Fig. 1) anchored to the base plate 11 and having its other end 14 secured to a pin 15 of a toothed segment 16. The segment 16 pivots about a post 17 which is carried by the bearing plates, and has a pin 18 extending through a slot 19 of a lever 20 carried by a pivot 21 fixed on the upper bearing plate. As will be hereinafter brought out, the lever 20 is actuated to cock the segment 16 and drive spring 13 simultaneously with cocking of the shutter drive mechanism, such actuation of the lever being in a counterclockwise direction. In Fig. 1 the spring 13 and segment 16 are shown in cocked positions.

The segment 16 engages a pinion 22 which is fixed to and concentric with a cog-wheel 23 engaging in turn a second pinion 24 fixed to and concentric with a second cog-wheel 25. The cog-wheel 23 has a semi-circular pin or stop 26 which is engageable by the hooked end or nose 27 of a pivoted latch member 28 mounted on a stationary pivot 29 carried by a bearing plate. The latch member 28 has an angularly-shaped arm 30 engageable by a lug 31 which is rigidly carried by the usual shutter blade actuating ring (not shown).

The lug 31 is shown in the position it occupies when the shutter is cocked, and in response to release of the shutter drive mechanism and functioning of the shutter drive mechanism the lug 31 will move downward, as viewed in Fig. 1, along a slot 32 provided in the base plate 11. In so moving, the lug 31 will engage the angular arm 30 of the latch 28 and swing the latter counterclockwise, disengaging the nose portion 27 of the latch from the pin 26 and releasing the delayed-action device 12 for operation.

Only a short movement of the lug 31 occurs however, since it is halted by a detent device comprising a lever 33 carried by the pivot 17 and having an abutting edge or shoulder 34 disposed in the path of movement of the lug. The shutter drive mechanism is thus detained, and such detention is temporary because of actuation of the lever 33 by the cocking lever 20. As shown, the lever 33 has a downwardly-extended portion provided with an upstanding lug 35 which is in the path of movement of a projection 36 on the cocking lever 20. When the latch 28 is released by the lug 31 the driving spring 13 becomes operative to actuate the delayed-action device, and the cocking lever 20 is moved clockwise until the projection 36 thereof engages the lug 35 of the lever 33. Thereafter the lever 33 is moved counterclockwise until the shoulder 34 thereof clears and disengages the lug 31, whereupon the shutter drive mechanism will complete its running-down movement, actuating the shutter blades in the well known manner. Normally the detent lever 33 is maintained in its arresting position shown by means of a spring 37, as it well understood.

The delayed action device 12 may have two operative portions or groups which may be coupled with or uncoupled from each other. One portion or group may comprise the segment 16, pinion 22, cog wheel 23, pinion 24 and cog wheel 25, and this portion may be considered as quick-acting and may be used as a synchro device for the synchronizing of flash lamps having a certain time lag.

The other portion of the delayed-action device may comprise a pinion 38 and affixed cog wheel 39 carried by a spindle 40 mounted on a lever 41 which is in turn pivoted on a post 42 carried by the lower bearing plate of the delayed-action device. The cog wheel 39 engages a pinion 43 affixed to a balance escapement wheel 44, said pinion and wheel being rotatable about the post 42 and the wheel driving a balance of the usual type (not shown in Fig. 1). The pinion 38 is shown as being disengaged from the cog wheel 25, thereby resulting in the two portions of the delayed-action device being uncoupled. By counterclockwise movement of the lever 41 the pinion 38 may be brought into engagement with the wheel 25, coupling the two portions of the delayed-action device and resulting in a much slower movement of the cocking lever 20 and detent lever 33, for purposes of delaying the action of the shutter while it is being driven by the shutter drive (which has the lug 31).

In accordance with the present invention novel means are provided by which the delayed-action device 12 may be maintained in cocked position while yet permitting the shutter drive mechanism and shutter blades to pass through a complete cycle of operation. This means also renders inoperative the detent lever 33 which normally detains the lug 31 of the shutter drive mechanism.

In accomplishing this result there is provided, as shown in Fig. 1, a second locking means or latch 45 which is carried on the post 29 and which has a hooked or nose portion 46 engageable with the stop pin 26 of the cog wheel 23 of the delayed-action device. The lever or latch 45 is normally urged clockwise by a spring 47, and has an upward extension 48 engageable by a pin 49 carried on a settable ring 50 which is concentric with the shutter opening, as shown.

The ring 50 has an actuating member or finger piece 51 and is normally urged clockwise by a helical extension spring 52. It will be observed that the pin 49, for the position in which the ring 50 is shown, normally maintains the locking latch 45 in inoperative position as indicated. As the ring 50 is shifted counterclockwise to disengage the pin 49 from the extension 48 of the lever 45 the spring 47 will urge the lever 45 in engagement with the pin 26, thereby to maintain in cocked condition the delayed-action device. The pin 49, upon continued counterclockwise movement of the ring 50, may engage an upward extension 53 of the detent lever 33, shifting the latter counterclockwise to an extent where the shoulder 34 thereof is shifted out of the path of movement of the lug 31 of the shutter drive mechanism.

By the above organization it will be seen that, upon a proper setting of the settable ring 50, the shutter drive and the shutter blades may pass through a complete cycle or operation without actuating the delayed-action device 12, and the latter will remain cocked by virtue of the latch 45 taking over the function of the latch 28. The downward movement of the lug 31 will of course actuate the latch 28 but this will have no effect on the delayed-action device 12, and upon return of the shutter drive mechanism to cocked position the latch 28 will again take over its locking function. It is indifferent, insofar as the above auxiliary locking means 45 is concerned, whether the opening movement of the shutter blades is done by the shutter drive mechanism or by another procedure. In the case of a reflex camera, for example, manual operation of the shutter may be desired for the purpose of using the view finder, and in any case the delayed-action device will remain cocked and will not be made operative needlessly.

The above result is accomplished while still retaining the simultaneous cocking of the shutter and delayed-action or synchro device, and while still retaining the simple actuation of the delayed-action or synchro device by the shutter drive mechanism. The various adjustments for controlling the operation of the shutter may still be effected by the same simple components.

There is thus avoided unnecessary wear of the delayed-action and synchro device, and the life of this assemblage is accordingly correspondingly increased. Since the delayed-action device may remain in cocked position it will be at all times in readiness for any optional operations which may be desired.

It will be noted that only a very slight additional space axially of the lens assembly is required by the second locking means or latch 45, such space being required on the pivot pin 29 and being also required on the stop pin 26. In some circumstances even this slight additional space is not available, and to meet this condition the present invention provides a modified form of auxiliary locking latch, as shown in Fig. 2.

In this figure components which are similar to those already described in connection with Fig. 1 have been given like characters wherever possible, and many parts have been omitted for the sake of clarity of illustrations, only those parts being shown which deal with the modification. Notably the cog wheel 23 of the delayed-action device is shown, having a stop pin 54, and the lug 31 of the shutter drive mechanism is shown. The locking latches 28 and 45 are dispensed with, and in their place there is provided a single locking latch 55 carried by a pivot 56 which is mounted on a pivoted supporting arm 57 movable about a pivot 58 carried by the base plate 11. The arm 57 and the latch 55 are normally urged respectively counterclockwise and clockwise by a spring 59 engaging the pin 58 and a lug 60 on the latch 55. A nose portion 61 of hook-like configuration is provided on the latch 55 for engagement with the pin 54, and an angular arm 62 extends from the latch 55 into the downward path of movement of the lug 31 of the shutter drive mechanism.

In Fig. 2 there is not the specially provided settable ring 50 as in Fig. 1, but instead an existing ring (not shown) of the usual shutter mechanism is utilized to carry the pin 49 by which control is effected to maintain the delayed-action device cocked. The ring which carries the pin 49 may also carry a finger piece 63 having an index portion 64 cooperable with setting marks 65, 66 and 67 labeled respectively M, X and V, which may be provided on any suitable surface of the shutter housing 10. For the setting V as shown, the pin 49 will retain the movable arm 57 in the position shown wherein the function of the delayed-action device in providing for a time-delay of the shutter drive mechanism is effected. Same is valid also for a setting to the mark M, because in this case the arm 57 is in the same position as in the setting V. This corresponds to the functioning of the device of Fig. 1 as effected by the parts and positions which they occupy in this figure.

For a setting of X the pin 49 will be shifted upward in the direction of the arrow shown, shifting the arm 57 clockwise from right to left whereby the angular portion 62 of the latch 55 will occupy the broken line position shown. The locking action of the latch 55 on the delayed-action device 12 will still be retained, but the lug 31 will be permitted to travel downward without being detained, and accordingly desired operations of the shutter may be carried out without incurring unnecessary actuation of the delayed-action device.

Of course, with the parts in the positions shown in Fig. 2, actuation of the shutter drive mechanism will cause the lug 31 to swing the latch 55 counterclockwise, releasing the cog wheel 23 and causing actuation of the delayed-action device in the usual manner. The lug 31 will as usual be temporarily detained by a suitable detent lever (which is not shown in Fig. 2) such as the lever 33 of Fig. 1, and such detent lever may be actuated to render it ineffective in the manner indicated in Fig. 1 upon setting the index 64 to the position X, as will be understood. With the organization of Fig. 2 only a single thickness of metal, represented by the latch 55, will be required above the cog wheel 23, for engagement by the stop pin 54.

Another embodiment of the invention is illustrated in Figs. 3–9, wherein an auxiliary locking means is provided for the delayed action device 12, which is dissimilar from the latch 28 and disposed in a location remote from said latch. With such organization there is again the advantage that only one thickness of metal is required above the cog wheel 23, and the simplicity of the various components is maintained, together with simultaneous cocking of the shutter and delayed-action device. The various adjustments above described in connection with Figs. 1 and 2 are present in the embodiment of Figs. 3–9.

Parts which are similar to those already described above have, insofar as possible, been given like characters. Referring to Fig. 4 there is shown the cog wheel 23 having the stop pin 61. Cooperable with the pin 61 is a latch 69 pivotally carried by a pin 70 mounted on a bearing plate of the delayed-action device. A spring 71 normally urges the latch 69 clockwise, and said latch has a hooked arm 72 provided with a nose portion which is normally disposed in the path of the lug 31 of the shutter driving mechanism. The lug 31 actuates the latch 69 in the manner already described above.

After actuation of the latch 69 by the lug 31 the latter is halted by a detent lever 74 carried by a pivot 75 mounted on the upper bearing plate 76. The lever 74 is normally urged clockwise by a spring 77, and has an abutting edge or shoulder 78 normally engageable by the lug 31 when the lever 74 is in the broken line position shown in Fig. 3. As the parts are shown, in their full-line positions in Fig. 3, the delayed-action device is uncocked.

In this embodiment of the invention the second locking means which is utilized to maintain the delayed-action device cocked is located remote from the latch 69 and is quite dissimilar from said latch. Referring to Figs. 3, 5, 6 and 7 a control arm 80 is provided constituting a part of a stamping 81 having also a settable ring 82 which carries and is actuatable by the finger piece 63. The arm 80, Figs. 3 and 5, is engageable with a reciprocable balance 83 of the delayed-action device 12, to halt reciprocation thereof and accordingly to lock the delayed-action device in its cocked position.

Considering Fig. 9, the delayed-action device 12 is so arranged that the escapement or balance wheel 44 is engageable with the balance 83 to reciprocate the latter. By virtue of the arm 80 on the settable ring 82, the balance 83 may be held in raised position as shown in Fig. 3 wherein it locks the balance wheel 44 against turning, thereby locking the delayed-action device 12. It will be noted that for the positions M and X of the index mark 64 the ring 82 will be so positioned as to cause the arm 80 to lock the balance 83 and therefore lock the delayed-action device 12. Also, for the position X of the ring 82, the detent lever 74 will be rendered inoperative, thereby to permit uninterrupted or unimpeded actuation of the shutter and/or shutter driving mechanism.

To accomplish this latter, referring to Figs. 3, 6 and 7, the stamping 81 is provided with an arm 84 having a cam portion 85 engageable with a downturned lug 86 on the detent lever 74. In Fig. 3 the cam portion 85 is shown holding the detent lever 74 in a counterclockwise-shifted position, rendering it inoperative and enabling the lug 31 of the shutter drive mechanism to have an unimpeded downward movement. The ring 82 is also utilized to effect coupling and uncoupling of the two portions of the delayed-action device 12, and this is accomplished by a portion 87 of the stamping 81, Figs. 5, 6 and 7 which is engageable with a finger 88 of a pivoted arm 89 carrying the pinion 38, cog wheel 39, pinion 43 and balance wheel 44. The arm 89 is normally urged clockwise by a spring 90 as shown in Fig. 5, and is shifted counterclockwise to disengage the pinion 38 from the cog wheel 25 when the portion 87 of the stamping 81 engages the finger 88. Such uncoupling occurs only for the setting M of the index mark 64.

From the foregoing it can be seen that for the setting X of the index 64 the shutter and shutter driving mechanism may operate unimpeded, without actuation of the delayed-action or synchro device, the latter remaining cocked, this being due to the locking action effected on the balance 83 by the arm 80, and by the detent lever 74 being held inoperative by the cam portion 85 of the stamping 81. For the settings M or V the shutter is controlled respectively by the synchro portion of the delayed-action device or by the entire delayed-action device, for the latter condition the balance 83 being released by the arm 80 and the two portions of the delayed-action device being coupled by release of the finger 88 (Fig. 5) by the portion 87 of the stamping 81. When the shutter is actuated without impediment the delayed-action device will remain cocked, and for any condition of the shutter it is always possible to choose any one of the settings M, X or V, or to cancel these settings.

Owing to lost motion which may exist within the delayed-action device it may occur that during operation of the shutter for the adjustment X the pin 61 will come to rest in a slightly different position after shifting movement of the latch 69, Fig. 4, by the lug 31. Due to such different position the latch may no longer be able to bolt the pin 61. To cope with this, there is provided two bolting edges 92 and 93 on the nose of the latch 69, the edge 93 being further removed than the edge 92 from the pivot 70. By the provision of the further removed surface 93 it is always possible for the latch 69 to bolt the stop 61. When cocking the shutter anew the cog wheel 23 will always be, because of surplusage in its movement, put into position wherein the bolting may be done by the edge 92 and accordingly the same starting place of the delayed-action or synchro device is guaranteed with every condition of the shutter.

Figure 8:
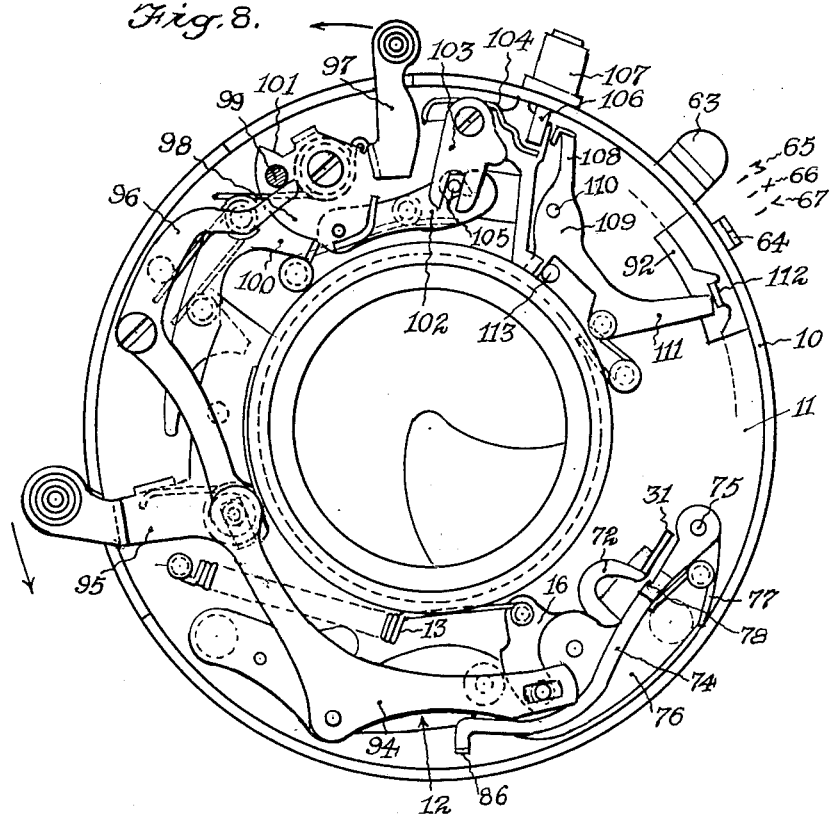
Fig. 8 is a front view of a shutter mechanism made in accordance with the invention, incorporating the embodiment of Figs. 3–7. Certain parts have been omitted for the sake of clarity of illustration.

Figs. 8 and 9 illustrate the assembly of the shutter driving and delayed-action devices provided by the invention in Fig. 3. The cocking lever for the delayed-action device, indicated at 94 in Fig. 8 is illustrated as coupled to a connector lever 96. The shutter mechanism has a cocking lever 97 connected to a spring-charged sector 98 which is arranged to actuate by means of a pin 99 the levers 96 and 94 so that simultaneous cocking of the delayed-action device 12 and the shutter drive mechanism is effected.

Such simultaneous cocking is effected by counterclockwise turning of the lever 97, wherein the pin 99 drives the lever 96 clockwise, effecting counterclockwise movement of the lever 94, by which the delayed action device 12 is cocked.

The cocked position of the lever 94 is the same as the position shown for the lever 20 of Fig. 1, which lever 20 is a counterpart of the lever 94. It will be noted that the pin 99 and lever 96 constitute a one-way driving connection, and that when the delayed action device is cocked the lever 96 is out of the patch of movement of the pin 99, whereby the shutter mechanism may be actuated without interference on the part of the lever 96, so long as the delayed action device is held in cocked position. The rotary or circular path of movement of the pin 99 during release and cocking of the shutter is not occupied by the lever 96 while the delayed action device remains cocked.

A release lever 95 actuates a latching lever 100 which is engageable with a shoulder 101 on the sector 98 to retain the latter in cocked position. A linkage 102 connects the sector 98 to the shutter ring (not shown) in the usual manner, and a bifurcated arm 103 carrying a contact spring 104 is arranged to be actuated by a pin 105 on the shutter actuating ring. The contact 104 is cooperable with a contact 106 carried by a fitting 107 for use with the flash lamp cable, and there is also provided a contact 108 cooperable with the contact 106 and carried by a lever 109 mounted on a pivot 110 and having an extension 111 engageable with a finger 112 carried by the settable ring 82.

For the positions X and V of the ring 82 the lever 109 is locked in the position shown; for the setting M the lever 109 is unlocked by the finger 112 and may swing counterclockwise as permitted by a pin 113 on the shutter blade ring, to cause engagement between the contacts 106 and 108 for actuation of the flash bulb. Engagement of the contacts 108 and 106 occurs prior to engagement of the lug 31 of the shutter blade ring with the shoulder portion 78 of the detent lever 74, and engagement of the contact 104 with the contact 106 occurs when the shutter blades reach their fully open position.

In summary, for the setting V of the settable ring 82 the two portions of the delayed-action devices 12 are coupled to each other. The balance 83 is free and the detent lever 74 is operative to effect delayed-action of the shutter. The contact lever 109 is locked, and an exposure may be carried through by means of a delayed-action, in the well known manner. The flash lamp will be energized at the very moment of giving free the complete shutter aperture by engagement of the contacts 104 and 106.

For the setting X of the ring 82 the two portions of the delayed-action device remain coupled, but the balance 83 is locked and the detent lever 74 rendered inoperative. The contact lever 109 is also locked and consequently the shutter may be actuated without impediment or any influence by the delayed-action or synchro device. This device however remains in cocked position. The closing of the flash bulb circuit is effected through the contacts 104 and 106, as for the setting V.

For the setting M the two portions of the delayed-action devices are uncoupled and although the balance 83 is locked it will have no influence on the one portion i.e. the quick-acting portion, of the delayed-action device. The detent lever 74 is allowed to be operated, and the contact lever 109 is free. Therefore upon release of the shutter a contact closure occurs between the contact 106 and 108 at the latest when the lug 31 of the shutter blade ring strikes the shoulder 78 of the detent laver 74. At the same time the synchro device is actuated by the lug 31 and thereafter the shutter blade ring is free for opening the shutter.

The structure as provided by the present invention and illustrated and described above is advantageous in that the shutter and delayed-action device may be cocked simultaneously, and that for cocked as well as uncocked positions of the shutter the settings M X or V of the settable ring 82 may be made. Furthermore, delayed-action exposure may be effected for the setting V, and for other settings the delayed-action device will remain cocked. For the setting M flash lamps having a time lag may be readily synchronized with shortened speeds. Flash lamps without time lag can be synchronized with setting X for all shutter speeds, and this setting may be used for all exposures without flash lamp and without delayed action. For setting X the delayed-action or synchro device remains cocked and thus there is obviated needless operation of said device, with a consequent saving in wear of the parts thereof. The delayed-action or synchro device is put in use only when necessary.

The various adjustments may be effected by a special actuating member or may be effected by modifying an actuating member already existing in the structure. The means by which the delayed action device is held cocked may be used in conjunction with single as well as combined delayed-action devices, serving as delayed-action and synchro devices. In each case the delayed-action device may be kept in cocked position when the shutter is used for purposes not requiring said device.

Variations and modifications may be made within the scope of the claims, and portions of the improvements may be used without others.

We claim:

1. A photographic shutter having a drive mechanism; a spring-charged, normally-cocked, delayed-action device having a spring separate from and independent of said shutter drive mechanism; means for cocking said device; a releasable lock for holding said device normally cocked, said lock being operable for release by said drive mechanism; means connected with the delayed-action device and cooperable with the shutter drive mechanism, for coupling the said device to the shutter drive mechanism to delay the action thereof; and settable means for rendering said coupling means inoperative, including means for concurrently holding cocked said delayed-action device, said settable means thereby enabling the shutter to be operated independently of said delayed-action device.

2. The invention as defined in claim 1 in which the settable means includes a second lock for the delayed-action device, and includes means rendering said second lock operative when the coupling means is rendered inoperative.

3. The invention as defined in claim 2 in which both the locks comprise members which are of similar construction, and in which there is a single part of said delayed-action device which is engaged by said members.

4. The invention as defined in claim 3 in which the similar members comprise latches, and in which the single part comprises a stop cooperable with said latches.

5. The invention as defined in claim 2 in which the first-mentioned lock is disposed adjacent the shutter drive mechanism, and in which the second lock is disposed remote from said first-mentioned lock and adapted for manual operation.

6. The invention as defined in claim 5 in which the first mentioned lock includes a stop on said delayed-action device and a latch engageable with said stop, in which the delayed-action device includes a balance and a balance wheel, and in which the second lock includes a manually-operable member engageable with the balance to hold the latter inoperative against the balance wheel.

7. The invention as defined in claim 1 in which the lock includes a latch member engageable with the delayed-action device and movable between positions wherein it is either disposed in or disposed out of the path of movement of a portion of the shutter drive mechanism, said member being included in said means for concurrently holding cocked the delayed-action device.

8. The invention as defined in claim 7 in which the said latch member comprises a lever, in which there is a pivot for said lever, and in which the delayed-action device includes a stop cooperable with said lever, and in which there is a support means for movably mounting the pivot for said latch.

9. The invention as defined in claim 1 in which the settable means includes a ring mounted to be concentric with the shutter aperture.

10. A photographic shutter having a drive mechanism; a delayed-action device; means for cocking said delayed-action device; means connected with the delayed-action device and cooperable with the shutter drive mechanism for coupling the delayed action device to the shutter drive mechanism to delay the action thereof; and settable means for rendering said coupling means inoperative; locking means responsive to and actuated by said settable means, concurrently holding and maintaining cocked said delayed-action device, said settable means thereby enabling the shutter to be operated independently of said delayed-action device and while the latter remains cocked.

References Cited in the file of this patent

UNITED STATES PATENTS

| | | |
|---|---|---|
| 1,941,292 | Deckel et al. | Dec. 26, 1933 |
| 2,081,727 | Barenyi | May 25, 1937 |
| 2,245,248 | Aulenbacher | June 10, 1941 |
| 2,404,526 | Pirwitz | July 23, 1946 |
| 2,663,233 | Rentschler | Dec. 22, 1953 |

FOREIGN PATENTS

| | | |
|---|---|---|
| 655,511 | Great Britian | July 25, 1951 |